United States Patent [19]

Elliott

[11] 4,039,272

[45] Aug. 2, 1977

[54] APPARATUS AND METHOD FOR CARRYING OUT REACTIONS IN A FLUIDIZED BED

[75] Inventor: Douglas Ernest Elliott, Sutton Coldfield, England

[73] Assignee: Stone-Platt Fluidfire Limited, West Midlands, England

[21] Appl. No.: 616,948

[22] Filed: Sept. 26, 1975

[51] Int. Cl.² .............................................. F23D 19/02
[52] U.S. Cl. ....................................... 431/7; 431/170; 432/15; 432/58
[58] Field of Search ............................... 431/7, 170, 2; 110/28 J; 432/58, 15; 34/57 D

[56] References Cited

U.S. PATENT DOCUMENTS 3,884,617   5/1975   Virr ........................................ 431/170

FOREIGN PATENT DOCUMENTS 133,742   8/1973   Belgium

*Primary Examiner*—Edward G. Favors
*Attorney, Agent, or Firm*—Arnold, White & Durkee

[57] ABSTRACT

Apparatus for carrying out a reaction in a fluidized bed comprises a rotatable drum with a circumferential wall which is permeable to gases. A bed of particles is supported on the circumferential wall of the rotating drum during operation and the reactants are fed into the bed, at least a fluidizing gas through the circumferential wall. A receiver is provided to retain during operation small particles carried from the bed by the fluidizing gas. The small particles are returned to the bed when operation ceases. A reservoir for discharging larger particles into the bed after operation has commenced may be provided.

18 Claims, 6 Drawing Figures

APPARATUS AND METHOD FOR CARRYING OUT REACTIONS IN A FLUIDIZED BED

BACKGROUND OF THE INVENTION

From one aspect, this invention relates to apparatus of the kind comprising a bed of particles and means for feeding into the bed a gaseous fluid and reactant, for example air and a combustible material, in such a manner that, during normal operation of the apparatus, the bed is fluidised and the reactant undergoes a required change in the bed.

In known apparatus of the kind referred to which is used for carrying out combustion, the bed is supported on an upwardly presented face of a horizontal support which is permeable to gases, so that gases can be admitted through the support to fluidise the bed. The maximum rate at which the fluidising gases can be passed into the bed depends upon the size and weight of the particles of which the bed is composed. If the gas velocity is too great, the particles will be blown away from the support and the bed will be depleted. There is thus a maximum rate at which combustible material can be consumed in unit area of this known combustion apparatus of the kind referred to, the limiting rate depending upon the nature of the particles of which the bed is composed. The rate at which combustible material can be consumed may be increased by increasing the area of the bed or increasing the weight of the individual particles. Both of these expedients have attendant disadvantages. A bed of increased size requires larger apparatus which will be more costly and will occupy a greater space. If larger, heavier, particles are employed, the surface area per unit mass of the particles is reduced. In cases where the particles are required to react chemically with the products of combustion, for example to absorb oxides of sulphur, increasing the size of the particles reduces their effectiveness as chemical reactants. Generally, the greater the particle size, the greater the depth of the bed necessary to ensure complete combustion within the bed.

It is an object of the present invention to provide apparatus capable of effecting combustion at a rate greater than can be achieved with known fluidised bed combustion apparatus of the same size having similar particles.

SUMMARY OF THE INVENTION

According to a first aspect of the invention there is provided apparatus comprising a rotatable drum having a circumferentially-extending wall which is permeable to gases, feed means for mixing a gaseous fuel and air or another gaseous oxidant and for feeding the mixture through the wall and a bed of particles which, at last when the apparatus is in use, is supported on an internal face of the peripheral wall and is fluidised, whereby the fluid is burned in the bed.

When the drum is rotated, the particles of which the bed is composed tend to move away from the axis of rotation towards the circumferential wall. If the fluidising gases are admitted to the bed through the circumferential wall, the centrifugal action opposes the action of the gases on the particles and, provided the drum is rotated at a sufficiently high speed, the particles will not be blown completely away from the circumferential wall by fluidising gases entering the bed at high speed.

The apparatus may additionally include inlet means for delivering a solid or liquid fuel to the drum. During an initial period of use of the apparatus, when the apparatus is started from cold, a mixture of a gaseous fuel and air may be fed to the drum to burn therein and heat the bed. When the normal operating temperature of the bed has been reached, delivery of the solid or liquid fuel to the drum may be commenced and feed of the gaseous fuel may then be terminated.

According to a second aspect of the invention there is provided apparatus comprising a rotatable drum within which there is supported, at least when the apparatus is in use, a bed of particles, the drum having a circumferentially extending wall which is permeable to gases, feed means for establishing a flow of air or other gas through the wall into the bed to fluidise the bed and inlet means for receiving a solid or liquid reactant from outside the apparatus and delivering such reactant to the drum, whereby said reactant and the gas can react with each other in the fluidised bed.

Variable speed drive means may be provided for rotating the drum. This arrangement enables the apparatus to operate satisfactorily with widely different rates of supply of combustible material and oxidant. In the known combustion apparatus of the kind referred to having a stationary horizontal support, the ratio of the minimum rate of supply of fluidising gases (at which the bed is only just fluidised), to the maximum rate at which fluidising gases can be supplied, (above which rate particles are blown away from the bed) is approximately 1 :5. In the case of apparatus in accordance with the present invention having variable speed drive means for the drum, the ratio of the minimum to he maximum rate at which fluidising gases can be supplied may be as large as 1 : 100. The drum would be rotated relatively slowly when fluidising gases are supplied at a low rate and the drum would be rotated at high speed when fluidising gases are supplied at a high rate.

The bed may comprise particles of different sizes, for example some particles having diameters in the range 200 micron to 350 micron and other particles having a diameter of at least 400 micron. Preferably, the largest particles have diameters not exceeding 1,000 micron. Combustion can be initiated in the bed and the bed heated to its normal operating temperature more easily when the bed contains particles having diameters within the range 200 to 350 micron than in a case where all particles of the bed have diameters of 400 micron or more.

According to a third aspect of the invention there is provided a method of carrying out a reaction in a fluidised bed wherein the bed is supported on the internal face of a permeable circumferentially-extending wall of a drum which is rotated and fluidising gas is admitted to the bed through said wall.

In a case where the method is applied to the combustion of a gaseous fuel, a mixture of the fuel and air or some other gaseous oxidant may be fed to the bed at a velocity above the flame speed in the mixture, at least after an initial period of operation during which the temperature of the bed is raised to a value above the minimum ignition temperature of the mixture. This procedure enables the risk of combustion spreading from the fluidised bed to the mixture which is being fed towards the bed to be avoided. If the speed at which the drum is rotated is sufficiently high, the velocity at which the gaseous mixture is fed towards the drum can be far in excess of the flame speed in the mixture.

The composition of the bed may be varied in such a manner that the average size of the particles in the bed is ultimately greater than the average size of the particles in the bed initially.

DETAILED DESCRIPTION

Figure 1:
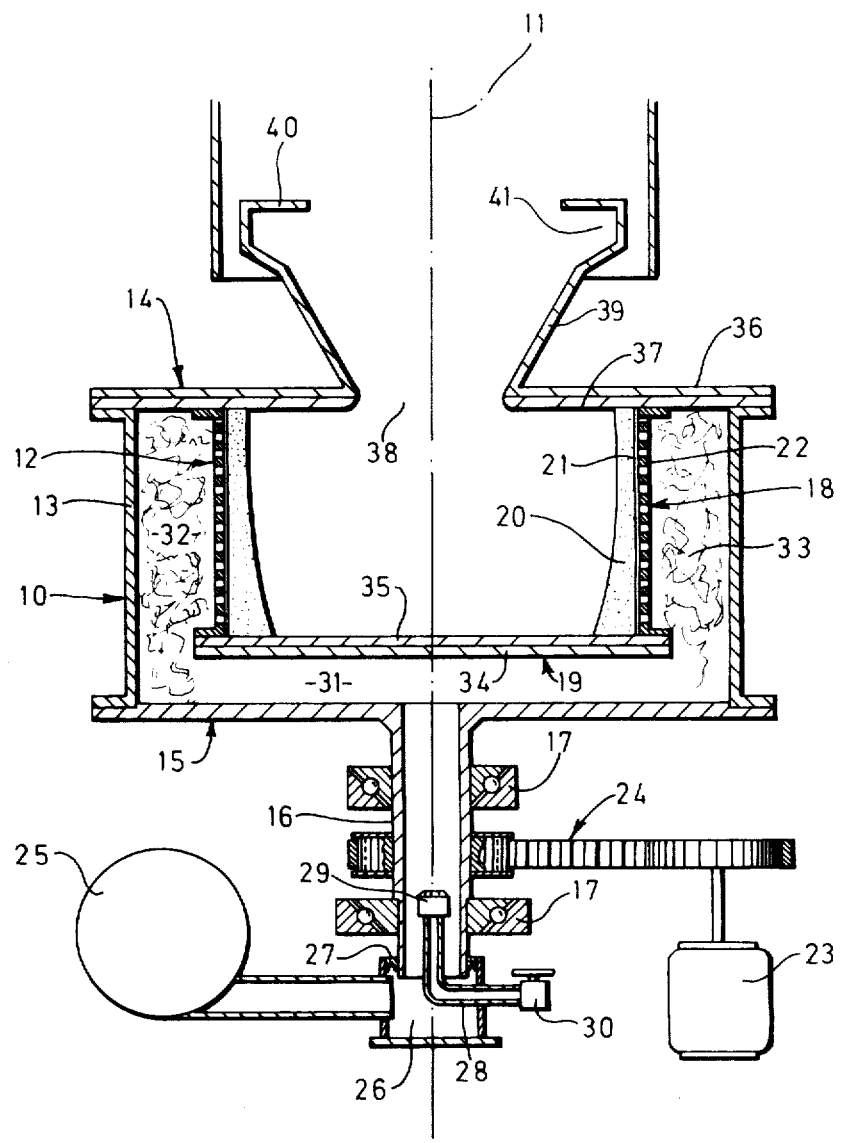
FIG. 1 shows a cross-section of one example of apparatus in accordance with the invention for burning a gaseous combustible substance in air, the cross-section being taken in a plane containing an axis of rotation of a drum of the apparatus.

The apparatus shown in FIG. 1 comprises a housing 10 which is mounted for rotation about a vertical axis 11 and which contains a drum 12 secured to the housing for rotation therewith. The housing 10 includes a cylindrical side wall 13 which is secured to an upper end wall 14 and a lower end wall 15, the joints between the side wall and the end walls being fluidtight. The housing is carried on a hollow shaft 16 which is secured to the lower end wall 15, extends downwardly therefrom and is carried by bearings 17 which support the housing 10 on a stationary base structure (not shown).

The drum 12 comprises a permeable circumferentially-extending wall 18 which is concentric with the side wall 13 of the housing. The drum further comprises an impermeable lower end wall 19 which is secured to the wall 18 and the wall 18 is secured at its upper end to the upper end wall 14 of the housing. Within the drum there is a quantity of refractory particles which, when the apparatus is in use, form a bed 20 which is supported on the internal face of the wall 18 and covers this internal face completely. When the drum 12 is not rotating, the particles will fall to the bottom of the drum and be supported on the lower end wall 19. The permeable wall 18 comprises an inner layer in the form of a sheet 21 of metal which is formed over its entire area with perforations sufficiently small to enable the particles of the bed 20 to be supported by the sheet. The wall further includes an outer layer 22 which has sufficient rigidity and strength to support the sheet 21 and the bed 20 when the drum 12 is rotated at high speed without deflection or deformation of the wall 18. The layer 22 is formed over its entire area with apertures which permit the access of gases to the perforate sheet 21 from outside the drum 12. The layer 22 may be formed, for example, of a metal mesh.

Variable speed drive means is provided for rotating the housing 10 about the axis 11. This drive means includes a variable speed motor 23 which is also mounted on the base structure. The motor is conveniently either a pressure fluid motor or an electric motor. There is associated with the motor speed control means (not shown) whereby the speed of rotation of the housing can be varied, either continuously or in steps. The motor is connected with the shaft 16 by a toothed belt drive 24.

The apparatus further comprises feed means for mixing a gaseous fuel and air for feeding the mixture into the bed 20 through the permeable wall 18 to fluidise the bed. The feed means comprises a blower 25, the outlet of which leads to a stationary chamber 26. A lower end portion of the shaft 16 extends into the chamber 26 and a seal 27 is provided between the rotatable shaft and the walls of the stationary chamber. The feed means further comprises a stationary fuel pipe 28 which extends through the chamber 26 into the shaft 16 where it terminates at a mixing device 29. The mixing device may be a simple form of nozzle having a number of small outlet passages distributed around its periphery to direct a corresponding number of gas steams into the air stream which is established in the shaft 16 when the apparatus is in use. A fuel control valve 30 is provided in the fuel pipe. It will be noted that the mixing device 29 is situated downstream of the seal 27 so that if leakage does occur at this seal, gaseous fuel supplied through the pipe 28 will not escape.

The duct defined internally of the shaft 16 leads from the chamber 26 through an opening in the lower end wall 15 to a space 31 between this end wall of the housing 10 and the lower end wall 19 of the drum. At the periphery of the drum, this space communicates with an annular passage 32 defined between the perforate wall 18 of the drum and the side wall 13 of the housing. It will be noted that the passage 32 is closed at its upper end by the upper end wall 14. In the passage 32 there is provided a flame trap in the form of a mass of copper wool 33.

Each of the upper end wall 14 and lower end wall 19 also comprises two layers. The lower end wall 19 has an outer layer 34 of sheet metal and an inner layer 35 of a thermally-insulating refractory material, for example a material based on asbestos fibres. The upper end wall 14 similarly comprises an outer layer 36 of sheet metal and an insulating inner layer 37. The upper end wall 14 is formed with a central outlet opening 38 through which the products of a reaction occurring in the drum 12 can leave the drum. Extending upwardly from the outlet opening there is a divergent outlet passage which is defined by a frusto-conical wall portion 39. At the upper end of this wall portion there is a ring 40 which has a channel-shaped cross-section. The channel defined by the ring 40 constitutes a trap 41 for particles and has its open mouth presented raidally-inwardly towards the axis 11.

When the apparatus is out of use, the drum 12 contains a mixture of particles having at least two different sizes. The mixture includes a quantity of smaller particles having respective diameters within the range 200 to 350 micron and a quantity of larger particles having respective diameters within the range 400 to 1,000 micron. It will be appreciated that some degradation of the particles is likely to occur during use of the apparatus, so that although the mixture of particles initially in the drum may comprise only particles which fall within the size ranges indicated, at least after the apparatus has been used for a time, the mixture is likely to include relatively small proportions of particles, the sizes of which fall outside the ranges indicated. The particles may be of silica sand.

The apparatus shown in FIG. 1 is intended for burning weak mixtures of air or some other gaseous oxidant with a combustible substance. By a weak mixture, is meant a mixture in which the proportion of combustible material is so small that, if the mixture is ignited at ambient temperature, it will not continue to burn unless heat is transmitted to the mixture. Such weak mixtures result from coating processes in which solvents or other combustible organic materials are driven off from a coating during drying or curing. Recovery of such organic materials is generally uneconomic and emission to the atmosphere would result in atmospheric pollution. It is therefore desirable to burn the organic solvents to water and carbon dioxide. One difficulty which has been encountered heretofore when attempting to burn such a weak mixture without the addition of extra fuel is that the rate of flow of gas away from the combustion zone is high, as compared with the rate of flow of combustible material into the combustion zone and the heat released by combustion is generally insufficient to maintain the temperature in the combustion zone above the minimum ignition temperature. The prior practice has therefore been to maintain a flame by burning a gaseous fuel and to inject the weak mixture into the flame.

The apparatus shown in FIG. 1 is capable of burning a weak mixture without consuming additional fuel, except during an initial period of operation when the temperature of the bed is being raised. A stream of the weak mixture is fed by the blower 25 through the chamber 26, shaft 16, space 31, passage 32 and permeable wall 18 into the drum 12. The drum and housing 10 are rotated at a low speed, preferably a speed which is just sufficiently great to establish a fluidised bed of particles completely covering the internal face of the permeable wall 18. The mixture is fed by the blower at a rate just sufficiently great to fluidise the bed of particles under these conditions. If the bed 20 is cold, i.e. at ambient temperature, the weak mixture from the blower will not continue to burn within the drum 12, even if it is ignited. The mixture is therefore enriched by the supply of a gaseous fuel through the fuel pipe 28 during an initial stage of operation of the apparatus. The enriched gaseous mixture is ignited within the drum 12, for example by directing a flame into the outlet opening 38, and combustion initially occurs close to the surface of the bed 20. The temperature of the bed is raised by this combustion and when the temperature of the bed has reached the minimum ignition temperature of the enriched gaseous mixture, combustion will occur entirely within the bed.

The speed at which the drum 12 and housing 10 are rotated can then be increased, the rate at which the gaseous mixture is fed from the blower 25 being increased correspondingly to maintain the bed 20 in a fluidised condition. The supply of gaseous fuel through the fuel pipe 28 can then be reduced and, in many cases, terminated so that the weak mixture alone burns in the bed 20.

At some point in the initial stage of operation, during which stage the temperature of the bed is raised, the speed of rotation of the drum is increased and the rate at which the gaseous mixture is fed from the blower is increased, the rate at which gases are fed into the bed 20 is increased to a value such that the smaller particles are carried out of the bed and through the outlet opening 38. Since rotation of the drum 12 causes rotation of the gases, there is centrifugal action on particles which are entrained in the gases passing through the outlet opening and these particles are thrown against the wall portion 39. The combined effects of centrifugal action and upward movement of the gases causes the particles to move over the internal face of the wall portion 39 into the trap 41 defined by the ring 40. Particles which are received in the trap are retained thereby by centrifugal action during operation of the apparatus.

The maximum gas velocity is selected in accordance with the maximum speed of rotation, the sizes and masses of the particles so that the larger particles remain in the bed 20. It will be appreciated that by causing the smaller particles to be carried out of the bed, the average size of the particles within the bed is increased. I have discovered that combustion can be established in the bed more easily when the bed contains small particles, preferably having diameters within the range of 200 to 350 micron. If the bed also contains larger particles, the gas velocity can be increased to a value at which the smaller particles are carried out of the bed.

It will be noted that the lower boundary of the trap 41 slopes downwardly towards the axis 11. Accordingly, when the speed of rotation of the drum 12 falls below a predetermined value as rotation is being terminated, the particles retained in the trap 41 will fall back into the drum 12 so that when the apparatus is next brought into operation the bed will contain the smaller particles.

Figure 2:
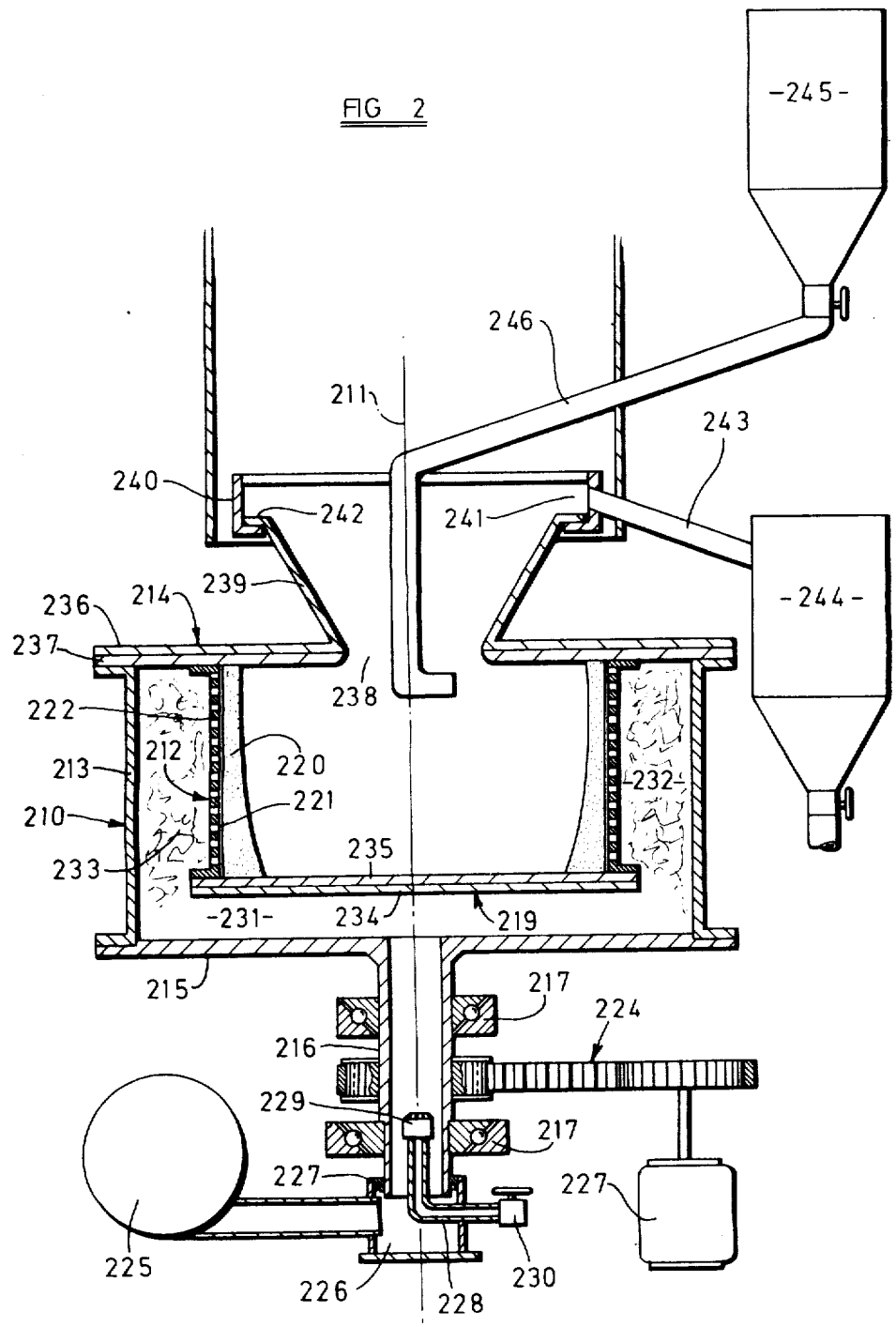
FIG. 2 shows a similar cross-section of a further example of apparatus in accordance with the invention for burning a gaseous combustible substance in air.

In FIG. 2 there is illustrated apparatus which differs from that of FIG. 1 in respect of the means provided for varying the average size of the particles in the bed. Certain parts of the apparatus shown in FIG. 2 correspond to those already described with reference to FIG. 1 and are indicated by like reference numerals with the prefix 2. Except for the differences hereinafter mentioned, the preceding description is deemed to apply to such corresponding parts.

The frusto-conical wall portion 239 of the apparatus shown in FIG. 2 terminates at its upper end in a radially outwardly projecting flange 242. This flange projects into a trap 241 defined by a stationary ring 240. At at least one position around the axis 211, there communicates with the trap 241 a duct 243 which leads to a receiver 244. This receiver is in the form of a hopper having at its lower end an outlet through which the contents of the hopper can be discharged under the control of a movable shutter or of a valve.

The apparatus of FIG. 2 further comprises a reservoir 245 having at its lower end an adjustable outlet which communicates with a duct 246 through which the contents of the reservoir 245 can be discharged into the drum 212. The reservoir 245 is off-set from the axis 211 and an upper part of the duct 246 slopes downwardly from the reservoir to a position on the axis and level with the top of the ring 240. A lower part of the duct extends vertically downwards through the outlet opening 238 into the drum and terminates in an end portion which projects radially from the axis so that particles are discharged from the duct 246 in a direction towards the circumferentially-extending wall 218 of the drum. The reservoir contains a quantity of particles having sizes within the range 400 to 1,000 micron.

Initially, a quantity of smaller particles is placed in the drum 212 to form the bed 220. A stream of a weak mixture of air and a combustible substance is fed by the blower 225 through the chamber 226, shaft 216, space 231, passage 232 and permeable wall 218 into the drum 212. Additional gaseous fuel is introduced into this mixture through the mixing device 229. The mixture is ignited in the drum 212 and burns therein so that the bed 220 is heated. Eventually, combustion takes place within the bed. The supply of gaseous fuel through the mixing device 229 may be reduced or terminated at this stage, or at a later stage of operation.

The rate at which fluidising gases are fed to the bed 220 is increased so that the smaller particles, having diameters within the range of 200 to 250 micron, are gradually carried from the bed by the exhaust gases and pass through the outlet opening 238 into the trap 241. As the smaller particles are carried from the bed in this manner, larger particles, having sizes within the range 400 to 1,000 micron, are introduced into the bed from the reservoir 245. Untimately, all of the smaller particles initially present in the drum will have been replaced by larger particles.

Either before, during or after the substitution of the smaller particles in the bed by larger particles, the speed of rotation of the drum 212 is increased to a value such that the larger particles will not be carried from the bed by the fluidising gases when the gases are fed to the bed at a high rate.

Figure 3:
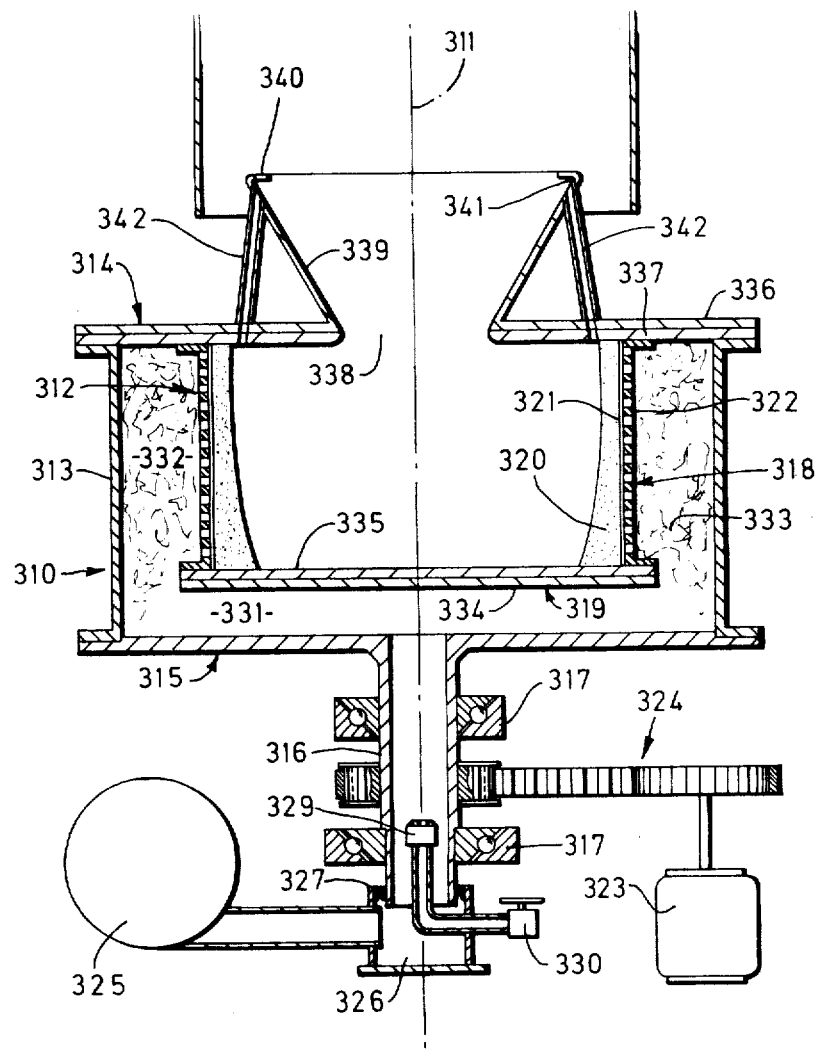
FIG. 3 shows a similar cross-section of a third example of apparatus in accordance with the invention for burning a gaseous combustible substance in air.

In FIG. 3 there is illustrated a further form of apparatus which differs from the apparatus of FIG. 1 in that means is provided to convey particles received in the trap back to the bed during operation. Certain parts of the apparatus shown in FIG. 3 correspond to those already described with reference to FIG. 1 and are indicated by like reference numerals with the prefix 3. Except for the differences hereinafter mentioned, the preceding description with reference to FIG. 1 is deemed to apply to such corresponding parts.

At the upper end of the frusto-conical wall portion 339 of the apparatus shown in FIG. 3 there is a re-entrant flange 340 projecting towards the axis 311. This flange, together with an adjacent part of the wall portion 339, defines a trap 341 in which particles carried by the exhaust gases through the outlet opening 338 are received.

A plurality of return ducts 342 lead from the trap 341 through the wall portion 339 and the upper end wall 314 to the bed 320. It will be noted that the lower end of each duct 342 is spaced further from the axis 311 than is the upper end of the return duct. Accordingly, when the apparatus is in use, particles which reach the trap 341 will move under centrifugal action through one or other of the return ducts 342 back to the bed. When the apparatus is in normal operation, small particles will circulate continuously from the bed through the outlet opening 338 to the trap 341 and then back to the bed. Larger particles which are not entrained by the gases leaving the bed will remain in the bed.

The several forms of apparatus shown in FIGS. 1, 2 and 3 are well adapted to reduce the loss of heat from the fluidised bed. Heat which is radiated and conducted radially-outwardly from the bed will be imparted to the permeable circumferentially-extending wall of the drum through which the incoming gaseous mixture passes. This mixture will therefore carry heat from the wall back into the bed. Similarly, heat conducted and radiated to the lower end wall will be imparted to the gaseous mixture flowing through the space between the lower end wall of the drum and the lower end wall of the housing. Although some heat will be radiated from the bed through the outlet opening, the rate of such radiation is not very high as the bed faces radially-inwardly towards the axis and the insulating layer of the upper end wall extends between the end and the outlet opening.

The apparatus shown in each of FIGS. 1, 2 and 3 typically has a drum with a diameter of 14 inches and a length of 14 inches. If apparatus having such dimensions contains particles of diameter 700 micron and the drum can be rotated at speeds of up to 112 r.p.m., a gaseous mixture can be fed into the bed at a rate of 1,000 standard cubic feet per minute. If apparatus having the same dimensions contains particles of diameter 1,000 micron and the drum can be rotated at speeds of up to 225 r.p.m., the gaseous mixture can be fed into the bed at a rate of 2,000 standard cubic feet per minute.

The apparatus shown in each of FIGS. 1, 2 and 3 can alternatively be used for the combustion of a gaseous fuel. In this case, the blower would feed a stream of air or some other gaseous oxidant to the bed and the gaseous fuel would be injected into this air stream by the mixing device. The apparatus has the advantage that, after an initial period of operation during which the temperature of the bed is raised to a value above the minimum combustion temperature, the gaseous mixture can be fed to the drum at a velocity far in excess of the flame speed in the mixture, so that even if the flame trap becomes ineffective, there is no risk of combustion spreading from the bed to the passage 32 (232, 332) or the space 31 (231, 331). For example, a mixture of natural gas and air in which the flame speed is approximately 1.5 feet per second may be fed initially to the cold bed at a rate such that the velocity at the surface of the bed is less than 1 feet per second. Under these conditions, a stable flame can be maintained adjacent to the bed. When the temperature of the bed is above the minimum combustion temperature, the rate at which the gaseous mixture is fed to the bed can be increased until the velocity in the shaft, space 31 and the passage 32 is above 10 feet per second. The speed of rotation of the housing and drum would be increased accordingly.

The bed 320 of the apparatus shown in FIG. 3 is preferably composed mainly of particles having diameters within the range of 200 to 350 micron. The housing and drum can preferably be rotated at a slow speed such as to apply to the prticles of the bed an acceleration in the radially inward direction of 5g and at a high speed which applies an acceleration of 30g or more.

In order to minimise entrainment of particles from the bed in the gases passing through the outlet opening the radius of this outlet opening is preferably at least three times the axial length of the permeable wall. In order to achieve this desired relationship, the axial length of the drum shown in FIGS. 1, 2 and 3 may be decreased and the radius of the drum increased correspondly from the dimensions hereinbefore given by way of example.

Figure 4:
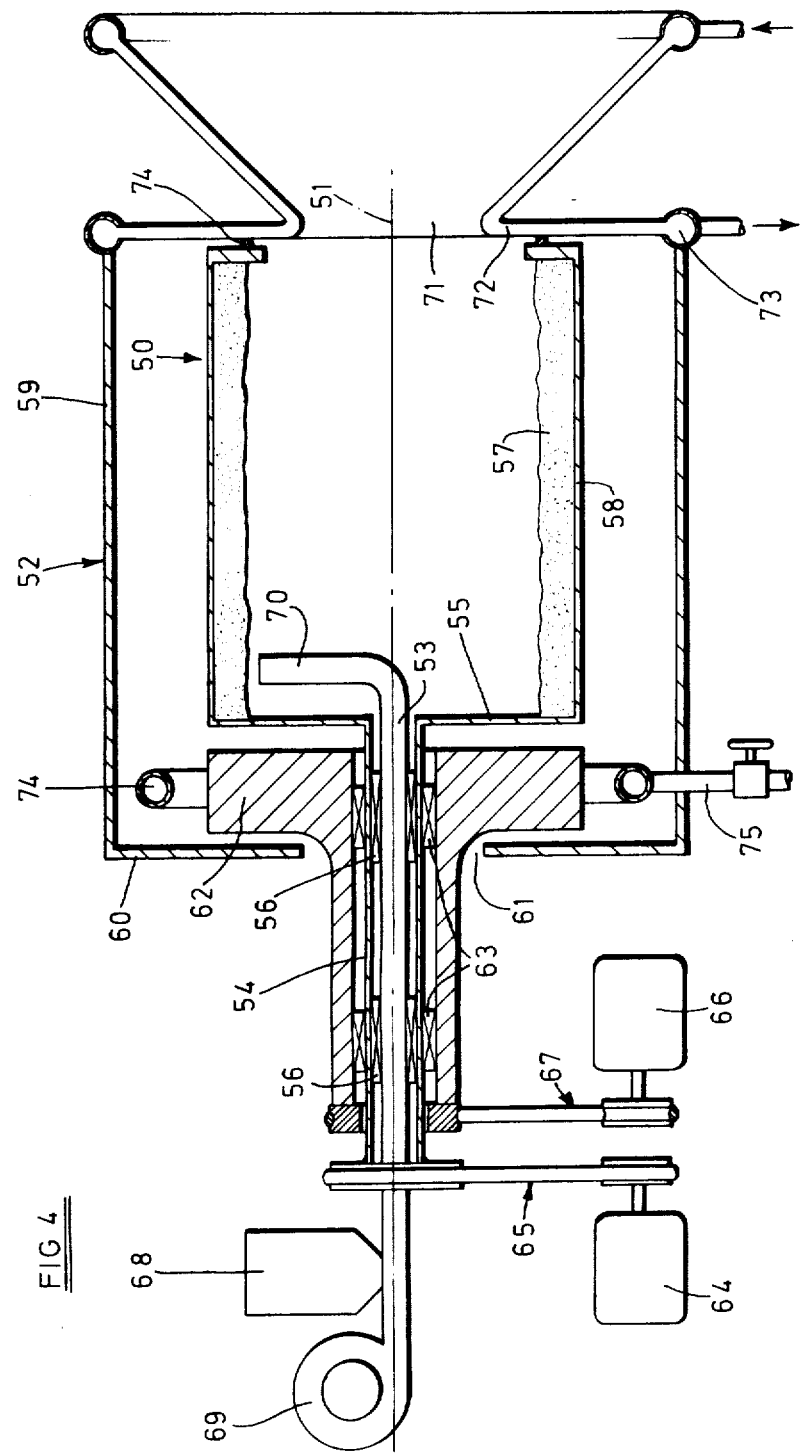
FIG. 4 shows diagrammatically a similar cross-section of an example of apparatus in accordance with the invention for burning a solid fuel in air.

The apparatus which is illustrated diagrammatically in FIG. 4 is intended for the combustion of a solid fuel, for example powdered coal. The apparatus comprises a drum 50 which is mounted for rotation about a horizontal axis 51 and is disposed within a stationary housing 52. The drum is mounted on a fixed horizontal shaft 53 by means of a sleeve 54 which is secured to and projects outwardly from an end wall 55 of the drum. Bearings 56 are interposed between the shaft 53 and the sleeve 54 and the shaft is carried on a stationary base structure (not shown).

Within the drum 50, there is disposed a quantity of refractory particles which, when the apparatus is in use, form a bed 57 which extends over and is supported on the inwardly-presented face of a circumferentially-extending wall 58 of the drum. This circumferentially-extendng wall is permeable to gases and may comprise two layers as hereinbefore described with reference to the permeable wall 18 of the apparatus shown in FIG. 1.

The housing 52 comprises a cylindrical side wall 59, which is concentric with the permeable wall 58, and an end wall 60 which defines a central air inlet opening 61. The sleeve 54 extends through the centre of the air inlet opening 61 but there is an annular gap between the sleeve and the boundary of the opening 61, through which gap air can be admitted to the housing 52. Between the end wall 55 of the drum and the end wall 60 of the housing there is disposed a fan 62 which is mounted by means of bearings 63 on the sleeve 54.

Variable speed drive means comprising a motor 64 is provided for driving the drum 50. The motor 64 is connected to the sleeve 54 by a belt drive 65. Further variable speed drive means comprising a motor 66 is provided for driving the fan 62. The motor 66 is connected to the fan by means of a further belt drive 67. The motors 64 and 66 may be fluid driven or electric motors. They would be provided with respective speed control means for varying their respective speeds either continuously or in steps.

The hollow shaft 53 forms a part of fuel inlet means for delivering a solid fuel into the bed 57. The fuel inlet means further comprises a hopper 68 for receiving a charge of crushed or powdered coal and a fan 69 for establishing a current of air which transports powdered coal from the hopper 68 through the shaft 53 into the drum. An end portion of the shaft 53 extends through an opening in end wall of the drum and communicates with a delivery duct 70 situated within the drum and extending from the shaft 53 in a direction away from the axis 51 to a position which is spaced just radially inwardly of the surface of the bed 57 when the latter is fluidised. Since the duct 70 is stationary, fuel will be discharged into an annular zone of the bed adjacent to the end wall 55 when the apparatus is in use. In consequence of the fluidised condition of the bed, the particles of fuel will be distributed throughout the bed.

In a case where the fuel used is powdered coal, volatile combustible matter will be evolved from the coal when it comes into contact with the hot bed 57 and also possibly whilst it is within the discharge duct 70. As the flow of gas within the bed is in the radially-inward direction, such volatile combustible material will not remain in or pass into the bed. The volatile combustible matter will mix with the hot, gaseous products of combustion leaving the bed and will flow therewith towards an outlet opening 71 in an end wall 72 of the drum which is remote from the end wall 5. If complete combustion of the fuel is required within the apparatus, sufficient air would be fed by the fan 62 into the drum 50 to provide for complete combustion of the fuel and as rotation of the drum will produce swirling of the gases in the space between the bed 57 and the axis 51, the volatile combustible material will be thoroughly mixed with excess air within the drum and will move over the surface of the hot bed so that combustion will be completed within the drum.

Alternatively, the apparatus may be used for gasification of coal, in which case air would be fed into the drum at a rate lower than that necessary to provide for complete combustion of the fuel. Gases leaving the drum through the outlet opening 71 would then contain combustible gases. Air entering the drum through the permeable wall 58 would be used for combustion of solid combustible material in the bed 57, rather than for combustion of the gaseous combustible material.

The end wall 72 may be a part of the drum and rotate with the permeable wall 58. Alternatively, the end wall 72 may be a part of a stationary annulus. As shown, such stationary annulus may contain a passage 73 for circulation of a coolant such as water. A seal 74 which can accommodate relative rotation is provided between the stationary annulus and a terminal flange of the drum.

The drum 50 may include vanes or other elements projecting radially-inwardly from the bed 57 to promote rotation of the gases within the drum about the axis 51. Such rotation of the gases would exert a centrifugal action on any solid particles entrained in the gases and would tend to throw such solid particles radially-outwardly into the bed. In this way, the retention of ash and small particles of solid combustible material within the bed may be assisted. Alternatively, there may be situated downstream of the outlet opening 71 a trap similar to the trap 41 hereinbefore described with reference to FIG. 1.

In a modification of the apparatus illustrated in FIG. 4, the fuel inlet duct 70 extends into the drum 50 through the outlet opening 71 instead of through the end wall 55. In this alternative construction, the fuel inlet duct may be water cooled. If the fuel intended to be used is powdered coal, it would be discharged into the bed near to the end wall 55 so that volatile material would have to traverse the length of the bed before emerging from the outlet opening 71. This arrangement would ensure that the volatile material is burned in the drum.

The apparatus shown in FIG. 4 further comprises means for mixing a gaseous fuel with air which is fed by the fan 62 into the drum 50. Such means comprises a ring of tubing 74 disposed within the housing 52 adjacent to the end wall 60 and radially-outwardly of the fan 62. A fuel supply pipe 75 communicates with the ring 74 and the latter is formed with small apertures through which gaseous fuel can be discharged into the air stream flowing into the annular passage between the permeable wall 58 and the side wall 59 of the housing. Gaseous fuel would be supplied in this manner during an initial period of operation of the apparatus, when the temperature of the bed is beng raised. The mixture of gaseous fuel and air would be ignited within the drum 50 to burn therein and heat the bed 57. When the temperature of the bed has reached a suitable value, preferably in excess of 800° C, the delivery of solid fuel through the duct 70 would be commenced and feeding of gaseous fuel through the ring 74 is then terminated.

During the initial stage of operation, when the temperature of the bed is being raised, the mixture of gaseous fuel and air may be fed into the drum at a rate such that the velocity of the gases at the exposed surface of the bed is not greater than 1 foot per second if natural gas or propane is used. The velocity could be higher if a gas rich in hydrogen was used, as the flame speed would than be higher. The speed at which the drum is rotated would be correspondingly low, so that the low gas velocity is just sifficient to fluidise the bed. When the normal operating temperature has been reached, the rate at which air is fed into the drum and the speed of rotation of the drum can be raised according to the rate at which it is required to consume the solid fule. The speed and the rate at which air is fed may be increased by a factor greater than 10.

During the initial stage of operation, the bed preferably includes at least some small particles, having diameters of approximately 250 microns. Such particles may be added to the bed on each occasion when the apparatus is to be brought into operation. Alternatively, the apparatus may include a trap which retains the smaller particles when the velocity of the fluidising gas is increased, so that these particles can be returned automatically to the bed when operation of the apparatus ceases. For operation with a high fluidising gas velocity, the bed preferably contains larger particles, for example having diameters of approximately 1,000 micron.

The heat released by combustion in the apparatus of any of FIGS. 1 to 4 may be recovered from the products of combustion by passing these products through a suitable heat exchanger. Alternatively, particularly in the case of the apparatus shown in FIG. 4, means for extracting heat may be disposed within the bed. Such means may comprise a plurality of finned tubes through which water or some other fluid to be heated is passed. In this case, the circumferentially-extending wall of the drum may be composed of ribs provided on the fins and disposed at the radially-outer edges thereof. Fluid may be fed to and from the finned tubes through pipes which extend through the interior of the sleeve 54, these pipes communicating with stationary pipes through suitable rotary couplings.

The apparatus shown in each of FIGS. 1 to 4 may also be adapted to burn a liquid fule. Such a fuel may be delivered to the drum by a spray nozzle arranged to spray a liquid fuel onto the external surface of the permeable circumferentially-extending wall of the drum. On coming into contact with the hot wall, the liquid fuel would be vaporised and carried into the drum by the air flowing through the permeable wall. Air may be fed to the drum at a rate sufficient to burn the fuel completely, or at a somewhat lower rate so that combustible gases are produced. A gaseous fuel would be mixed with the air during an initial stage of operation of the apparatus so that the bed can be heated by combustion of the gaseous fuel.

Alternatively, a liquid fuel may be vaporised or atomised and mixed with air which is fed into the drum. References herein and in the appended claims to a gaseous fuel are to be deemed to include the vapour of a liquid fuel and atomised liquid fuel.

The apparatus of FIG. 4 may be modified to burn a heavy oil which could not satisfactorily be introduced into the bed with the air which is fed into the drum through the peripheral wall thereof. In such modification, the hopper 68 and fan 69 would be omitted and the fuel inlet means would be adapted to pump the heavy oil thrugh the shaft 53 into the drum and to spray or otherwise discharge the heavy oil onto the radially-inwardly presented face of the bed 57. In other respects, the modified apparatus would be as shown in FIG. 4.

The arrangement illustrated in FIG. 4 has the advantage that the solid residue which results from the initial carbonisation of coal or heavy oil discharged onto the bed from the fuel inlet duct 70 will remain in the bed where the concentration of oxygen is relatively high, so that all of the combustible matter in the solid residue will be burnt relatively easily. Volatile matter which results from the initial carbonisation of the fuel, and which burns relatively easily, will mix above the bed with the gases leaving the bed and will react with the remaining oxygen which has not reacted with the solid combustible residue. Complete combustion of the fuel ca be ensured without providing a large excess of oxygen.

Figure 5:
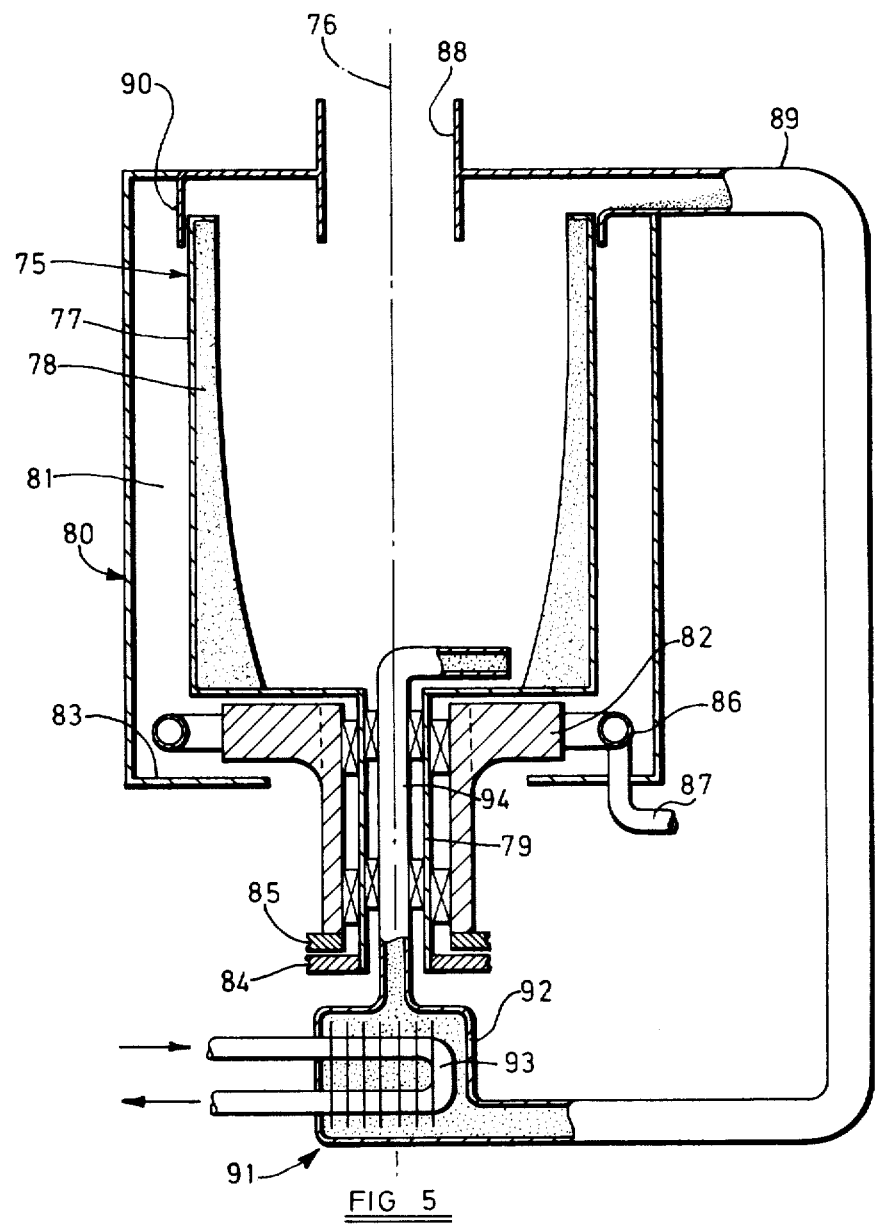
FIG. 5 shows diagrammatically a similar cross-section of a fifth form of apparatus in accordance with the invention.

In FIG. 5 there is illustrated diagrammatically a further form of apparatus in which some of the heat released by combustion is transferred to a heat exchanger by means of the particles which form the fluidised bed.

The apparatus of FIG. 5 comprises a drum 75 which is mounted for rotation about a vertical axis 76. The drum is open at its upper end and closed at its lower end and includes a peripheral wall 77 which is permeable to gases but is adapted to support particles of the fluidised bed 78 when the apparatus is in use. The drum is supported by a hollow shaft 79 which extends downwardly from a lower end wall of the drum and is carried by suitable bearings on a stationary support of the apparatus (not shown).

A stationary casing 80 extends around the drum 75 and is spaced therefrom to provide an annular passage 81. A fan 82 is mounted by means of suitable bearings on the outside of the shaft 79 at a position between a lower end wall of the drum and a lower end wall 83 of the casing. This lower end wall has a central opening adjacent to the fan 82 to admit air to the passage 81.

Respective motors (not shown) are provided for rotating the drum 75 and the fan 82. These motors are coupled to the drum and fan respectively by respective flexible belt drives which run on respective pulleys secured on the shaft 79 and the fan 82.

Means is provided for mixing a gaseous fuel with the air which enters the passage 81. This means comprises a ring of tubing 86 which is supported within the casing 80 and lies just radially outwardly of the fan 82. A fuel supply pipe 87 communicates with the ring 86 and the latter is formed with small apertures through which the gaseous fuel is discharged into the air stream flowing through the passage 81. At the upper end of the casing 80 there is an outlet opening 88 through which the gaseous products of combustion occurring in the bed 78 are discharged. The centre of this outlet opening lies on the axis 76.

A stationary duct 89 communicates with the interior of the casing 80 at a position immediately adjacent to the upper edge of the peripheral wall 77 of the drum. Except at the position of the duct 89, a stationary wall 90 encircles the upper end of the drum to prevent particles from the bed 78 passing radially-outwardly towards the periphery of the casing. The duct 89, which receives particles overflowing from the bed during operation, leads downwardly to a heat exchanger 91 comprising a housing 92 through which vertically-finned tubes 93 extend. A return duct 94 extends from the housing 92 through the interior of the shaft 79 into the drum 75. Means may be provided for admitting sufficient air to the duct 89, the housing 92 and the return duct 94 to fluidise the particles therein.

When the apparatus of FIG. 5 is operating normally, particles overflow from the bed 78 into the duct 89 and flow through same to the heat exchanger 91. Water or other fluid which is to be heated is passed through the tubes 93 to extract heat from the particles within the housing 92. The cooled particles pass from the heat exchanger through the return duct 94 into the drum 75 and return to the bed. Fuel and air enter the bed through the peripheral wall 77 of the drum and burn in the bed to heat the particles once more.

In addition to the fuel inlet ring 86, there may be provided means for delivering a solid or liquid fuel into the drum 75. Such means may comprise a delivery duct extending downwardly through the outlet opening 86 to a position near to the lower end wall of the drum for delivering fuel onto the radially-inwardly facing surface of the bed 78. Alternatively, liquid fuel could be delivered onto the radially-outwardly facing surface of the peripheral wall 77 of the drum by means of spray nozzles situated within the passage 81.

Figure 6:
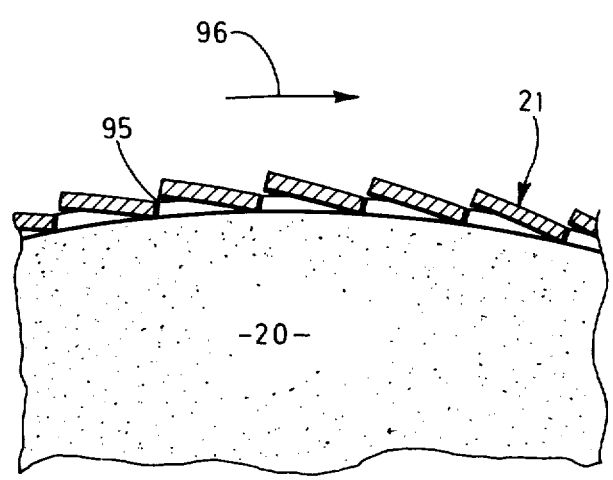
FIG. 6 shows on a much enlarged scale a detail of each of the forms of apparatus illustrated in FIGS. 1 to 5.

FIG. 6 shows a fragmentary cross-section through the inner layer 21 of the peripheral wall of the drum of FIG. 1 also shows the bed of refractory particles. The inner layer of the peripheral wall of the drum of the apparatus shown in each of FIGS. 2 to 5 is preferably identical with that illustrated in FIG. 6. It will be seen that each of the openings 95 through which gases enter the drum faces approximately in a direction along a tangent to the layer 21 of the drum at the position of the aperture. The direction of rotation of the drum is indicated in FIG. 6 by the arrow 96 and it will be seen that, as viewed from the outside of the drum, each of the apertures 95 faces in a direction opposite to the direction of rotation. The openings 95 face in a direction opposite to the direction of rotation so that the fluidising gases enter the fluidised bed in such a manner as to cause the particles in the bed to rotate relative to the drum in a direction similar to the direction of rotation of the drum. This has two effects. Firstly, it increases the rotational speed of the particles and thereby increases the radially-outward acceleration to which they are subjected. Secondly, the path of the fluidising gases through the bed has a tangential component as well as a radial component. This increases the length of the path over which the gases move whilst remaining in contact with the particles of the bed, effectively increases the residence time of the gases in the bed and thereby helps to increase the reaction rate.

In each of the embodiments of the invention illustrated in the accompanying drawings, the average depth of the bed when fluidised would be less than 3 inches. Preferably, the depth of the fluidised bed would be approximately one half inch. Such a shallow bed contains a relatively small mass of particles and therefore has a relatively low thermal inertia. Furthermore, the pressure drop across such a shallow bed is substantially less than that across a relatively deep bed.

As it is envisaged that the embodiments of the invention illustrated in the accompanying drawings would normally operate with the drum rotating at a speed such as to produce an acceleration in excess of 10 g. at the periphery of the drum, and with a correspondingly high velocity of fluidising gas sufficient to fluidise the bed at this rotational speed, the forces to which the particles of the bed would be subjected would be considerably greater than the forces to which particles of known combustion apparatus of the kind specified are subjected. Such relatively large forces acting on the particles tend to disrupt agglomerations of particles which may be produced by sintering, so that the apparatus can be operated with the temperature of the bed close to the sintering temperature without undue risk of sintering of the particles into a mass which will not fluidise.

The bed may include particles of calcium oxide or other substances capable of combining with products of combustion, for example sulphur dioxide, which are regarded at atmospheric pollutants. When such pollutant-absorbing particles are used, it is desirable that the sizes of the particles should be small as they then have a greater surface area to volume ratio and, mass for mass, will be more effective. The centrifugal action which is established on the bed during operation of combustion apparatus in accordance with the present invention enables smaller particles than would otherwise be the case for the same gas flow rate to be used.

A further advantage of apparatus in accordance with the present invention is that of flexibility with regard to the rate of supply of fuel. It is envisaged that by varying the speed of rotation of the drum appropriately, the bed can be maintained in a fluidised condition, and be retained within the drum at rates of supply of fuel which vary by a factor as great as 100.

One application of apparatus in accordance with the invention which is envisaged is for the combustion chamber of a gas turbine engine. Air from the compressor of the engine and fuel would be fed into the bed and burned therein. The hot products of combustion would then be led from the drum in which the bed is supported to the turbine of the engine. The drum would be driven from the turbine and may be mounted coaxially therewith.

One advantage of a gas turbine engine including combustion apparatus in accordance with the present invention is that the fuel could be fed with the air into the drum through the peripheral wall thereof. A second advantage is that the products of combustion leaving various parts of the bed would be at the same temperature so that the flow of hot gas into the turbine would have an even temperature distribution. A further advantage is that the apparatus could be arranged more easily than can known gas turbine engines to discharge into the atmosphere an exhaust which is substantially free of pollutants. The combustion apparatus could be arranged to ensure complete combustion of the fuel and the bed could include particles which retain oxides of sulphur whilst the relatively low combustion temperature would yield significantly lower quantities of oxides of nitrogen than are produced in conventional gas turbine combustors.

I claim:

1. Apparatus comprising a rotatable drum having a circumferentially extending wall which is permeable to gases, feed means for mixing a gaseous fuel and a gaseous oxidant and for feeding the mixture through the wall into the drum, a bed of particles which, at least when the apparatus is in use, is supported on an internal face of the peripheral wall and is fluidised, whereby the fuel is burned in the bed, and receiving means for receiving and for retaining during a period of use of the apparatus particles which are carried from the bed by gases leaving the bed.

2. Apparatus according to claim 1 wherein the drum has a closed lower end and an open upper end and the receiving means lies above the drum, whereby particles received therein can return to the drum through the open upper end under the action of gravity when operation ceases.

3. Apparatus according to claim 2 wherein the receiving means comprises a ring which is coaxial with the drum, has a channel-shaped cross-section and has an open mouth presented towards an axis of the drum.

4. Apparatus according to claim 3 wherein the ring is fixed with respect to the drum.

5. Apparatus according to claim 1 wherein the drum contains a mixture of particles which forms the bed and the mixture comprises a first group of particles having respective sizes within a first size range and a second group of particles having respective sizes within a second size range, the first and second size ranges being separated by a third size range and the quantity of particles having respective sizes within the third size range being insignificant.

6. Apparatus according to claim 1 wherein the drum contains a mixture of particles which forms the bed and the mixture comprises some particles having sizes within the range 200 to 350 micron and some particles having sizes within the range 400 to 1,000 micron.

7. Apparatus comprising a rotatable drum having a circumferentially extending wall which is permeable to gases, feed means for mixing a gaseous fuel and a gaseous oxidant and for feeding the mixture through the wall into the drum, a bed of particles, which, at least when the apparatus is in use, is supported on an internal face of the peripheral wall and is fluidised, whereby the fuel is burned in the bed, and a reservoir containing a mass of further particles, the reservoir being arranged for discharge of the further particles into the bed and means being provided for controlling the dishcarge of particles from the reservoir into the bed.

8. Apparatus according to claim 7 wherein the drum contains a first group of particles which form the bed during an initial stage of operation of the apparatus, the reservoir contains a second group of particles which form the bed in a later stage of operation and the average size of the particles in the first group is smaller than the average size of the particles in the second group.

9. Apparatus according to claim 8 wherein the first group of particles consists, at least mainly, of particles within the size range 200 to 350 micron and the second group of particles consists, at least mainly, of particles within the size range 400 to 1,000 micron.

10. Apparatus comprising a rotatable drum having a circumferentially extending wall which is permeable to gases, feed means for mixing a gaseous fuel and a gaseous oxidant and for feeding the mixture through the wall into the drum, a bed of particles which, at least when the apparatus is in use, is supported on an internal face of the peripheral wall and is fluidised, whereby the fuel is burned in the bed, means defining a passage through which fluidising gas is fed to the circumferential wall of the drum when the apparatus is in use, one side boundary of the passage being defined by said circumferential wall, and a flame trap in said passage.

11. Apparatus comprising a rotatable drum having a circumferentially extending wall which is permeable to gases, feed means for mixing a gaseous fuel and a gaseous oxidant and for feeding the mixture through the wall into the drum, a bed of particles which, at least when the apparatus is in use, is supported on an internal face of the peripheral wall and is fluidised, whereby the fuel is burned in the bed, and variable speed drive means for rotating the drum, the drive means having adjustable speed control means whereby the speed of rotation of the drum can be varied selectively.

12. Apparatus comprising a rotatable drum having a circumferentially extending wall which is permeable to gases, feed means for mixing a gaseous fuel and a gaseous oxidant and for feeding the mixture throught the wall into the drum, a bed of particles which, at least when the apparatus is in use, is supported on an internal face of the peripheral wall and is fluidised, whereby the fuel is burned in the bed, and a trap adjacent to an outlet opening of the drum for trapping particles which are carried out of the bed during operation of the apparatus.

13. Apparatus according to claim 12 wherein there is associated with the trap return ducts for leading particles received in the trap back to the bed whilst the apparatus is operating.

14. Apparatus comprising a rotatable drum having a circumferentially extending wall which is permeable to gases, feed means for feeding a fluidising gas through the wall into the drum, a bed of particles which, at least when the apparatus is in use, is supported on an internal face of the peripheral wall and is fluidised by said gas and outlet means for receiving a solid or liquid reactant from outside the apparatus and delivering such reactant to the drum, whereby the fluidising gas and the reactant can react together in the bed.

15. Apparatus comprising a rotatable drum having a circumferentially extending wall which is permeable to gases, feed means for mixing a gaseous fuel and a gaseous oxidant and for feeding the mixture throught the wall into the drum and a bed of particles which, at least when the apparatus is in use, is supported on an internal face of the peripheral wall and is fluidised, whereby the fuel is burned in the bed, wherein said wall defines a plurality of openings for admitting said mixture into the drum and said openings face in a tangential direction at the inner face of the wall.

16. A method of carrying out a chemical reaction in a fluidised bed wherein a drum having a permeable circumferentially extending wall is rotated, the bed is supported on the internal face of the wall, fluidising gas is admitted to the bed through the wall and the composition of the bed is varied in such a manner that the average size of the particles in the bed is ultimately greater than the average size of the particles in the bed initially.

17. A method of carrying out a combustion reaction in a fluidised bed wherein a drum having a permeable circumferentially extending wall is rotated, the bed is supported on the internal face of the wall, fluidising gas is admitted to the bed through the wall, the drum is initially rotated at a lower speed when the bed is cold and the drum is subsequently rotated at a higher speed when the bed is hot.

18. A method of treating a mixture comprising a gaseous oxidant and a combustible substance, the relative proportions being such that, if the mixture is ignited at ambient temperature, it will not continue to burn unless heat is transmitted to the mixture, in which method the mixture is fed through a permeable circumferentially-extending wall of a rotating drum into a bed of particles supported within the drum, the mixture being fed into the bed at a rate such that the bed is fluidised, and the mixture burns in the bed.

* * * * *